Nov. 13, 1951　　F. W. JARVIS　　2,574,872

MEANS FOR EFFECTING TRANSVERSE PARALLEL PLANE SCANNING OF THE ROTARY DRUM

Filed April 11, 1946　　2 SHEETS—SHEET 1

Inventor:
Frederick William Jarvis;
By his attorneys,
Baldwin & Wight

Inventor:
Frederick William Jarvis,
By his attorneys,
Baldwin & Wight

Patented Nov. 13, 1951 2,574,872

UNITED STATES PATENT OFFICE 2,574,872

MEANS FOR EFFECTING TRANSVERSE PARALLEL PLANE SCANNING OF THE ROTARY DRUM

Frederick William Jarvis, London, England, assignor to Associated Newspapers Limited, London, England, a company of Great Britain Application April 11, 1946, Serial No. 661,195
In Great Britain April 13, 1945

18 Claims. (Cl. 346—132)

Figure 1:
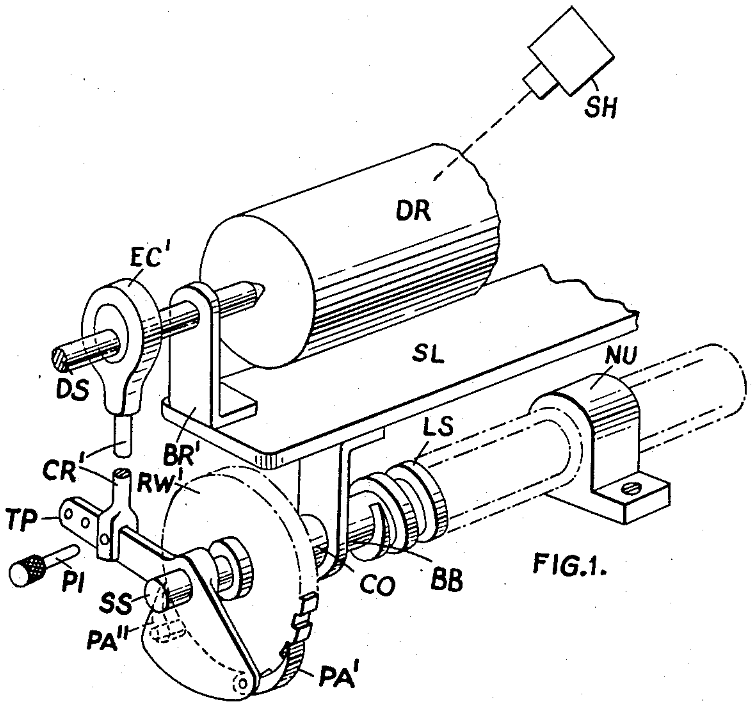

This invention relates to means for providing relative lateral movement between the rotary drum and scanning head in a picture telegraph instrument.

As is known, in instruments of this kind, the surface to be scanned is folded around a drum, and the drum is caused to rotate. Scanning is effected by means of a focused beam of light, which in the case of a transmitting instrument becomes modulated by the matter to be scanned and is then caused, either by transmission, refraction, or reflection, to impinge upon a light sensitive cell forming part of an electric circuit. In the case of a receiver the beam of light is modulated in accordance with signals representing the matter to be reproduced. In either case, in addition to rotation of the drum, relative movement, in the direction of the length of the drum, between the scanning head and the drum is necessary in order that the whole surface may be scanned. Usually lateral translation of the scanning head is provided for.

Lateral translation of the scanning head is effected by means of a screw which is coupled by gearing to the spindle upon which the drum is mounted and with which the scanning head carriage engages. Clearly, the gearing between the screw and the drum spindle must be correctly related, having regard to the size of the scanning spot, to ensure that the scanning head moves laterally through a distance corresponding to the width of the spot for each revolution of the drum: if it moved through a greater distance there would be an unscanned path between successive convolutions of the scanned path, and if it moved through a less distance, successive convolutions would overlap.

In order to provide for very fine resolution, it is necessary to use a small rectangular scanning spot sharply focused, and of exactly the same width as the scanned line. Unless the scanning head and the revolving drum are at all times exactly in the appropriate relative positions it will be necessary to defocus or mis-shape the spot in order to cover up the unscanned path, an altogether undesirable expedient. This necessity for a sharply defined rectangular spot calls for very accurate machining of the gears by which the screw and drum spindle are coupled, and this involves very great expense in the production of the instruments.

Other considerations, which add to the difficulty and consequent expense of making the gears and screw are the necessity for altering the gear ratio so as to deal with the scanning of surfaces of differing sizes, and the necessity for providing a reverse gear so as to scan for a positive for signals produced from a negative and vice versa.

According to the present invention a picture telegraph instrument of the kind which involves a rotary medium-bearing drum, that is a drum bearing matter to be scanned, or a medium upon which a reproduction is to be produced, a scanning head, and means including a screw for producing relative lateral movement between said drum and said scanning head, includes a ratchet wheel attached to said screw for causing rotation thereof (or attached to a member which engages a stationary screw for causing rotation of said member), and a co-operating pawl coupled to the rotary drum spindle in such manner as to be reciprocated thereby so that relative lateral movement corresponding to the width of one line is produced for each revolution of said drum.

The pawl may be coupled to the rotary drum or drum-spindle in such manner as to be reciprocated one or more times for each revolution of said spindle, or the throw of the pawl may be adjustable, or a slide may be provided, so that the pawl picks up at every tooth or at every *n*th tooth of the ratchet wheel whereby said relative lateral movement is effected in one or more steps for each said revolution.

The pawl may be coupled to the rotary drum spindle by means of an eccentric fixed to or associated with the rotary drum spindle, or by means of a cam fixed on or associated with said spindle, or by means of an electro-magnet operated by contacts on or associated with the drum spindle.

The ratchet wheel which may have saw-tooth shaped teeth or symmetrical generated teeth, has its teeth so spaced, having regard to the pitch of the screw by which the relative lateral movement is produced, that rotation of the ratchet through the required angular distance produces lateral translation of the rotary drum or scanning head a distance corresponding substantially with the width of the scanning spot. The angular distance may correspond to that of one or several teeth.

I have found as a result of experiment, that with reasonable care in manufacture, much less meticulous than is required in the case of the usual gears, and with a screw which may have a much coarser pitch of thread the same or improved closeness of scanning, with the same sized scanning spot can be obtained by means of my invention.

It will of course, be appreciated, that whereas in the usual coupling, that is with gearing, a spiral scanning path is provided, with the coupling provided by my invention the scanning path takes the form of a succession of circles or parts of circles lying in parallel planes to which the axis of the drum spindle is normal, each circle or part of circle being connected to the preceding and succeeding one by a short "side-step."

If saw-tooth shaped teeth are provided on the ratchet wheel reversal of the direction of translation can be provided for by the provision of two ratchet wheels having oppositely faced teeth, a double ended pawl or its equivalent serving either to push one ratchet in one direction or to pull the other in the other direction, the desired direction of translation being ensured by a selecting device. Similar arrangements can be made in the case of a generated wheel, although in such case it is not necessary to provide two wheels.

I prefer link-operated arrangement to the cam-operated arrangement, and prefer to mount the pawl on an actuating lever which is free to reciprocate about the screw-spindle, the link being attached at its one end to the lever and at its other end of the eccentric.

The sine motion of the eccentric link imparts a motion to the pawl and ratchet wheel which follows the same law. Thus shock in the mechanism is substantially avoided and as the motion is repeated in the same form and by the same elements, these elm107 cannot introduce errors.

It will be appreciated that this method of driving the lead screw results in a scan which is slightly non-linear, it being partly of spiral form and partly of the form above described. When a transmitter and a receiver, one of which scans in the usual spiral manner and the other of which scans in the manner provided by the mechanism of my invention, are in co-operative association, there will be some distortion in the reproduced image but as this will be less than half the width of a scanned line it will be less than that, due, for example, to shrinkage of the base of the photographic material, usually associated with photographic processes: it is therefore undetectable. Of course, if both instruments are scanning in the manner provided by the mechanism of my invention, distortion due to this cause is not present.

There being no gears coupling the drum spindle to the lead screw, any desired relative positions of the drum spindle and lead screw may be chosen.

If the ratchet wheel is provided with a number of teeth which is a multiple of the number required for scanning a drum of the maximum diameter which can be accommodated by the instrument, or for scanning a drum with the normal number of lines per inch, it is possible by merely altering the position of the pivot on the eccentric link to vary the relative angular velocities of the drum and lead screw. Thus drums of different sizes can be scanned without the ratio of length to breadth of the scanned area, or the number of lines per inch for a given size of drum, having to be altered. So that the scanning spot may be maintained in focus for drums of different diameter, that is, so that the distance from the optical head to the surface of the drum may be kept constant for these drums of different diameters, I arrange for the position of the optical head to be varied according to the diameter of the drum in use. I also arrange for variation of the width of spot in accordance with the width of scanning line required, that is, in accordance with the position of the pivot on the lever.

The relative angular velocities of the drum and lead screw can be altered in small steps and over a wide range, in a different manner, that is, by the provision of a plurality of ratchet wheels, and a like plurality of pawls, each pawl associated with its own ratchet wheel. Selection of a desired ratchet and pawl for co-operation may then be very simply effected mechanically or electromagnetically: it may be effected proximally or remotely, as for example from the transmitter, in which case the receiver may be left unattended.

Figure 2:
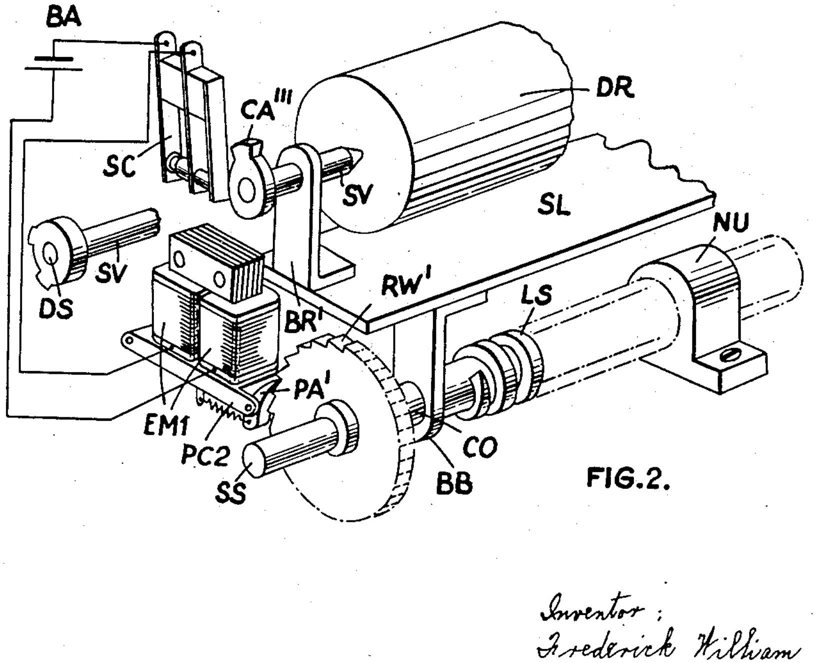
Figures 2A, 2B:
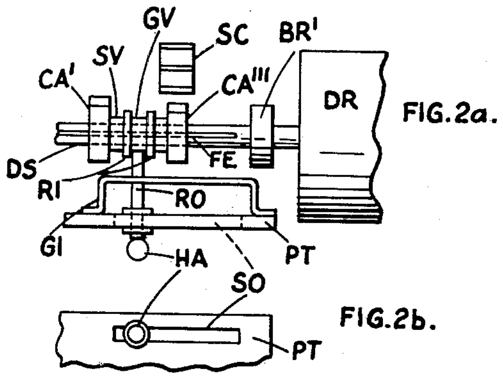
Figure 3:
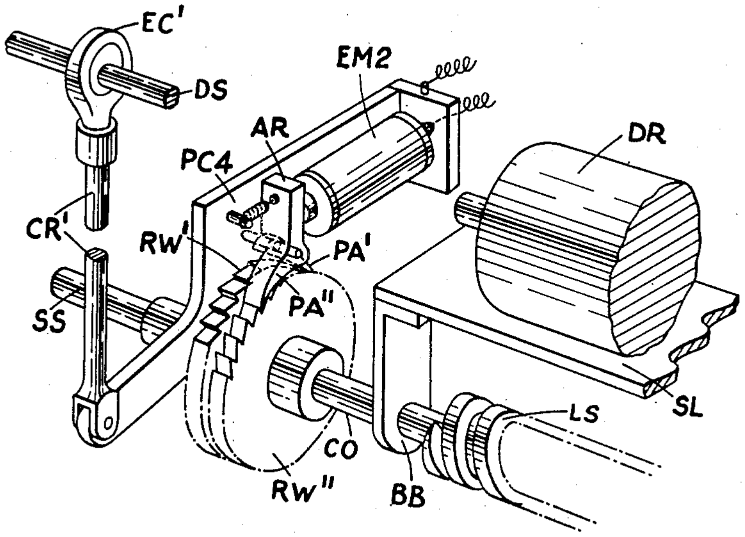

The invention is illustrated in the accompanying drawing, whereof Fig. 1 illustrates a preferred arrangement; Fig. 2 illustrates an electro-magnetic arrangement for reciprocating the pawl; Figs. $2^a$ and $2^b$ are details related to Fig. 2; Fig. 3 illustrates an alternative arrangement for producing either forward or backward lateral movement. All the figures are diagrammatic and illustrate a picture telegraph instrument of the kind in which relative lateral movement between the drum and scanning head is produced by translation of the drum.

So far as may be, the same reference numerals are used throughout the figures for the same parts.

Refer, now, to Fig. 1. The drum DR, upon which the matter to be scanned is mounted is driven from a prime-mover (not shown) by means of a spindle DS supported upon a slide SL by means of suitable brackets, only one BR' of which is shown. A lead screw LS is situated beneath slide SL and co-operates with a nut NU fixed to the frame or other stationary part of the instrument. A bearing bracket BB couples lead screw LS to slide SL. A collar CO prevents relative lateral movement between lead screw LS and bearing bracket BB. A ratchet or indexing wheel RW' is keyed to one end of lead screw spindle SS. A pawl carier PC1 is loosely mounted on screw spindle SS and carries a pawl PA'; it may, if desired, carry a second, oppositely faced pawl (shown in dotted lines at PA''). An eccentric and strap EC' is attached to drum spindle DS and is coupled by coupling rod CR' to the tail piece TP of pawl carrier PC1. Coupling rod CR' is coupled to the tail piece by means of a pin PI which passes through one or other, as desired, of a number of holes in the tail piece.

It will be seen, that with the arrangement illustrated and described, as drum spindle DS rotates, the eccentric imparts a reciprocatory movement to pawl carrier PC1 which, by means of that one of the pawls PA' or PA'' engaging the teeth of ratchet wheel RW', advances the ratchet wheel, thus imparting a step-by-step rotary movement to lead screw LS. The thread on lead screw LS meshes with a thread in nut NU so that step-by-step lateral movement is imparted to the screw, and thus to slide SL and drum DR so that the latter moves relatively to a scanning head represented at SH.

By alteration of the point at which coupling rod CR' is pinned to tail piece TP the angle through which the pawl, and consequently the extent of lateral translation of the drum for each revolution, can be adjusted.

Fig. 2 illustrates an electro-magnetic coupling between the drum spindle DS and lead screw spindle SS. In the main, the apparatus is the same as in Fig. 1. The ratchet wheel RW' is shown as having saw-teeth though, of course, it could have teeth of the same shape as those shown in Fig. 1. A system of cams (only two CA' and CA''' shown) on a slidable sleeve SV is keyed (see Figs. $2^a$ and $2^b$) to drum spindle DS for rotation therewith, spindle DS being provided with a feather FE which engages with an internal groove in sleeve SV. Sliding is effected by means of a rod RO, provided with an operating handle HA, at one end, and engaging, at its other end, a groove GV between two ridges RI on sleeve SV. Rod RO slides in a slot SO in a fixed plate PT attached to a stationary part of the instrument, and between guides GI, one of which is shown. In Fig. 2 cam CA''' is shown as having one peak; the other cam CA' is shown as having two peaks. A pair of circuit closing contacts SC is situated near to the operative cam so as to be operated thereby. An electro-magnet EM1 having an armature PC2 is situated near to the ratchet wheel and is included in a circuit which includes a source of electrical energy, represented as a battery BA, and contacts SC. Armature PC2 serves as a pawl-carrier and carries a spring loaded pawl PA': it may also carry a second spring loaded pawl (not shown). Pawl PA' co-operates with ratchet wheel RW'. The second pawl may co-operate with the same wheel RW' if the teeth are as in Fig. 1, or with a second saw-tooth ratchet wheel whose teeth are oppositely faced.

It will be seen, that with the arrangement illustrated in Fig. 2 and described in connection with that figure, as drum spindle DS rotates, the circuit for electro-magnet EM1 is closed one or more times, depending upon the number of peaks on the cam in use. Each time electro-magnet EM' is energised it draws up its armature. Pawl PA' advances the ratchet wheel, thus imparting step-by-step rotary movement to lead screw LS, with results as before. The direction of rotation will depend upon whether the pawl PA' or the second pawl referred to is in engagement with the ratchet wheel (or with the second ratchet wheel, as the case may be).

Figure 3 illustrates an alternative apparatus for producing reversal of the direction of rotation of the lead screw, with consequential reversal of the direction of lateral movement of the drum. The pawl carrier PC4 is loosely mounted on lead screw spindle SS and carries an electro-magnet EM2. A spring-retracted armature AR is also carried by pawl carrier PC4 and co-operates with the electro-magnet. Armature AR carries two pawls PA' and PA''. Two ratchet wheels RW' and RW'' are keyed to lead screw spindle SS and each is associated with a different one of the two pawls. With the armature spring-retracted, pawl PA'' engages with ratchet wheel RW'' for forward rotation, and with the armature attracted, pawl PA' engages with ratchet wheel RW' for backward rotation.

If desired, and preferably, two electro-magnets may be provided, one when energised serving to attract the armature to one side of a spring-maintained neutral position so as to engage one pawl with its ratchet wheel, and the other serving to attract the armature to the other side of the neutral position so as to engage the other pawl with the other ratchet wheel. This arrangement allows for forward or backward drive, or for idling, of the drum so far as lateral movement is concerned.

The apparatus disclosed embody the invention in the forms now preferred, but changes may be made in the construction and arrangement of the parts without departing from the invention as defined in the claims.

I claim:

1. In a picture telegraph instrument of the kind in which a rotary medium-bearing drum is scanned continuously, a rotary medium-bearing drum member, a scanning member mounted to focus a scanning spot on said drum member, means for so rotating said drum member that it is scanned by said scanning member in contiguous circular lines extending peripherally of the drum member in parallel planes disposed at right-angles to the longitudinal axis of the medium-bearing member, and means operable at the instants of completion of each circular line to move one of said members in a path lengthwise of the drum axis and thus laterally with respect to said circular lines and to an extent substantially the same as the width of one of said lines, to position said members to start scanning of the next succeeding line, the lateral movements thereby being step-by-step longitudinally with respect to the longitudinal axis of the drum member.

2. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet-wheel to said slide to impart lateral movement to said slide upon rotation of said ratchet wheel, a pawl-carrier carrying a driving pawl for rotating said ratchet wheel, and means for coupling said rotary spindle to said pawl-carrier for reciprocating said pawl-carrier so as to produce step-by-step lateral movement of said member equal to the width of a scanning line.

3. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet-wheel to said slide to impart lateral movement to said slide upon rotation of said ratchet wheel, a pawl-carrier carrying a driving pawl for rotating said ratchet wheel, and an eccentric mechanism and connecting rod coupling said rotary spindle to said pawl-carrier for reciprocating said pawl-carrier so as to produce step-by-step lateral movement of said member equal to the width of a scanning line.

4. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pivoted pawl-carrier carrying a driving pawl and having a tail piece for rotating said ratchet wheel, and an eccentric mechanism including an eccentric on said rotary spindle, a sheave for said eccentric, and a connecting rod connecting said sheave to said tail piece for reciprocating said pawl carrier so as to produce step-by-step lateral movement of said member equal to the width of a scanning line.

5. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pivoted pawl-carrier carrying a driving pawl and having a tail piece for rotating said ratchet wheel, and an eccentric mechanism including an eccentric on said rotary spindle, a sheave for said eccentric, and means for adjusting the point of connection of said connecting rod along the length of said tail piece so as to vary the angular movement of said ratchet wheel for each revolution of said rotary spindle.

6. A picture telegraph instrument as claimed in claim 1, characterized in that the means for producing the step-by-step movement comprises a slide supporting said rotary drum member to impart lateral movement thereto relatively to said scanning head member, a rotary spindle for said rotary drum member, an eccentric on said rotary spindle, a sheave for said eccentric, a lead screw, a fixed threaded nut for said lead screw, a bracket connecting the spindle of said lead screw to said slide to impart lateral movement to said slide upon rotation of said lead screw, a ratchet wheel fixed to the spindle of said lead screw, a pawl-carrier pivoted upon said last mentioned spindle, a pawl carried by said pawl-carrier adapted upon reciprocation of said pawl-carrier to rotate said ratchet wheel so as to impart lateral movement to said lead screw by rotation thereof, a tail piece for said pawl-carrier, and a connecting rod connecting said sheave to said tail piece so as to reciprocate said pawl-carrier upon rotation of said rotary spindle.

7. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a driving pawl for rotating said ratchet wheel, a longitudinally reciprocable link member having one end coupled to said pawl-carrier, and means associated with said rotary spindle and operating on the other end of said link member for imparting thereto reciprocating movement in accordance with simple harmonic law so as to produce step-by-step lateral movement of said member equal to the width of a scanning line.

8. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pivoted pawl-carrier carrying a driving pawl and having a tail piece for rotaing said ratchet wheel, a longitudinally reciprocable link member having one end coupled to said pawl-carrier, and means associated with said rotary spindle operating on the other end of said link member for imparting thereto reciprocatory movement in accordance with a simple harmonic law so as to produce step-by-step lateral movement of said member equal to the width of a scanning line.

9. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pivoted pawl-carrier carrying a driving pawl and having a tail piece for rotating said ratchet wheel, a longitudinally reciprocable link member having one end coupled to said pawl-carrier, and an eccentric mechanism including an eccentric on said rotary spindle and a sheave for said eccentric connected to the other end of said link member for imparting thereto reciprocatory movement in accordance with a simple harmonic law so as to produce step-by-step lateral movement of said member equal to the width of a scanning line.

10. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a driving pawl for rotating said ratchet wheel, and means including cam mechanism operated by said rotary spindle for reciprocating said pawl-carrier so as to produce step-by-step lateral movement of said member equal to the width of a scanning line.

11. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pivoted pawl-carrier carrying a driving pawl and having a tail piece for rotating said ratchet wheel, means including cam mechanism comprising a plurality of cams operated by said rotary spindle for reciprocating said pawl-carrier, and means for selectively bringing a desired one of said cams into operative association with said cam-follower so as to vary the angular movement of said ratchet wheel for each revolution of said spindle.

12. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a driving pawl for rotating said ratchet wheel, and an electric circuit including an electro-magnet, and cam-controlled circuit-closing contacts coupling said rotary spindle to said pawl-carrier for reciprocating said pawl-carrier so as to produce step-by-step lateral movement of said member equal to the width of a scanning line.

13. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, an electro-magnet having an armature serving as a pawl-carrier carrying a driving pawl for rotating said ratchet wheel, a cam on said rotary spindle, circuit-closing contacts adjacent to said cam and adapted to be operated thereby, a source of electrical power, and a circuit means connecting said contacts, source, and electro-magnet, reciprocation of said pawl-carrier armature producing step-by-step lateral movement of said member equal to the width of a scanning line.

14. A picture telegraph instrument as claimed in claim 1, characterized in that the means for producing the step-by-step movement comprises a slide supporting one of said members, to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, an electro-magnet having an armature serving as a pawl-carrier carrying a driving pawl for rotating said ratchet wheel, a plurality of cams having differing numbers of cam-humps, circuit closing contacts adjacent to said cams so as to be operated by a selected one thereof, a source of electric power, and circuit means connecting said contacts, source, and electro-magnet, said armature reciprocating said pawl so as to produce step-by-step lateral movement of said member equal to the width of a scanning line, and means for selectively bringing any one of said cams into operative engagement with said circuit-closing contacts so as to vary the number of times said pawl-carrier is reciprocated for each revolution of said ratchet wheel and thereby to vary the angular movement of said ratchet wheel.

15. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a first pawl for driving said ratchet wheel in one direction and an oppositely faced pawl for driving said ratchet wheel in the other direction, means for selecting one or other of said pawls for cooperation with said ratchet wheel, and means coupling said rotary spindle to said pawl carrier for reciprocating said pawl-carrier so as to produce step-by-step lateral movement of said member equal to the width of a scanning line in a selected direction.

16. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a first pawl for driving said ratchet wheel in one direction and an oppositely faced pawl for driving said ratchet wheel in the other direction, means for selecting one or other of said pawls for cooperation with said ratchet wheel, and an eccentric mechanism coupling said rotary spindle to said pawl-carrier for reciprocating said pawl-carrier so as to produce step-by-step lateral movement of said member equal to the width of a scanning line in a selected direction.

17. A picture telegraph instrument as claimed in claim 1, characterized in that the means for producing the step-by-step movement comprises a slide supporting one of said members to impart lateral movement thereto relatively to the other of said members, a rotary spindle for said drum member, a ratchet wheel, a lead screw and nut mechanism coupling said ratchet wheel to said slide to impart lateral movement to said slide upon rotation of said ratchet wheel, a pawl-carrier carrying a first pawl for driving said ratchet wheel in one direction and an oppositely faced pawl for driving said ratchet wheel in the other direction, an electro-magnet for exclusively selecting said first pawl for effective cooperation with said ratchet wheel, means for exclusively selecting said second pawl for effective co-operation with said ratchet wheel, and means coupling said rotary spindle to said pawl-carrier for reciprocating said pawl-carrier so as to produce step-by-step lateral movement of said member equal to the width of a scanning line in a selected direction.

18. In a picture telegraph instrument of the kind in which a rotary medium-bearing drum is scanned continuously, a rotary medium-bearing drum member, a scanning member mounted to focus a scanning spot on said drum member, mounting means for said drum member, means for so rotating said drum member that it is scanned by said scanning member in contiguous endless lines, each extending peripherally around the drum member and the lines being in parallel planes disposed at right-angles to the longitudinal axis of the drum member, a nut, a lead screw idle during scanning in said lines, said lead screw carrying said mounting means, said drum member being threaded to said nut, and means to turn said lead screw in said nut at the instant of completion of each of said endless line-scanning rotations of said drum member to slightly slide said mounting means and drum member in a path parallel to the axis of said lead screw to position said members to start scanning of the next succeeding endless line.

FREDERICK WILLIAM JARVIS.

REFERENCES CITED

The following references are of record in the file of this patent:

UNITED STATES PATENTS

| Number | Name | Date |
|---|---|---|
| 708,993 | De Braam | Sept. 16, 1902 |
| 1,322,613 | Purington | Nov. 25, 1919 |
| 1,580,896 | Ives | Apr. 13, 1926 |
| 1,598,739 | Mettler | Sept. 7, 1926 |
| 2,315,362 | Wise et al. | Mar. 30, 1943 |